(12) United States Patent
Kobayashi et al.

(10) Patent No.: US 8,677,567 B2
(45) Date of Patent: Mar. 25, 2014

(54) HINGE AND BRACKET FOR HINGE

(75) Inventors: Takao Kobayashi, Nagano (JP); Ikuomi Takahashi, Nagano (JP); Makoto Saito, Aikawa-machi (JP); Takashi Morimoto, Nagano (JP); Toshihiro Tamura, Nagano (JP)

(73) Assignee: NHK Spring Co., Ltd., Kanazawa-ku, Yokohama-shi, Kanagawa (JP)

( * ) Notice: Subject to any disclaimer, the term of this patent is extended or adjusted under 35 U.S.C. 154(b) by 0 days.

(21) Appl. No.: 13/375,071

(22) PCT Filed: May 24, 2010

(86) PCT No.: PCT/JP2010/058758
§ 371 (c)(1),
(2), (4) Date: Feb. 13, 2012

(87) PCT Pub. No.: WO2010/137564
PCT Pub. Date: Dec. 2, 2010

(65) Prior Publication Data
US 2012/0137469 A1  Jun. 7, 2012

(30) Foreign Application Priority Data
May 29, 2009 (JP) ................. 2009-130278

(51) Int. Cl.
*E05C 17/64* (2006.01)
*E05D 5/02* (2006.01)

(52) U.S. Cl.
USPC .................. 16/337; 16/386; 16/387; 16/330; 16/389

(58) Field of Classification Search
USPC ........... 16/337, 338, 339, 340, 268, 269, 342, 16/386, 387, DIG. 29
See application file for complete search history.

(56) References Cited

U.S. PATENT DOCUMENTS

| | | | | |
|---|---|---|---|---|
| 1,627,584 A * | 5/1927 | Tishken | .......................... | 16/265 |
| 5,054,723 A * | 10/1991 | Arnold | ............................ | 248/65 |
| 5,109,570 A * | 5/1992 | Okada et al. | .................... | 16/289 |
| 6,757,940 B2 * | 7/2004 | Lu et al. | .......................... | 16/330 |
| 7,082,642 B2 * | 8/2006 | Su | .................................. | 16/340 |
| 7,565,719 B2 * | 7/2009 | Su | .................................. | 16/337 |
| 7,992,255 B2 * | 8/2011 | Chang | ............................ | 16/337 |
| 8,015,668 B2 * | 9/2011 | Wang | ............................. | 16/338 |
| 2003/0140456 A1 * | 7/2003 | Hsieh et al. | ..................... | 16/340 |
| 2004/0093690 A1 * | 5/2004 | Lu et al. | ......................... | 16/330 |

(Continued)

FOREIGN PATENT DOCUMENTS

| JP | 2005-069367 | 3/2005 |
|---|---|---|
| JP | 2005-140152 | 6/2005 |
| JP | 2008-020033 | 1/2008 |

*Primary Examiner* — Chuck Mah
(74) *Attorney, Agent, or Firm* — Greer, Burns & Crain, Ltd.

(57) ABSTRACT

Provided is a hinge that can be manufactured easily in a short time. The hinge rotatably connects a first member and a second member, and is provided with two brackets that are rotatable against each other and mounted to the first member and the second member, respectively, and a friction-torque-generating member that generates friction torque by directly or indirectly pressing the two brackets against each other. A first of the two brackets is configured from an integral structure that includes a shaft part that passes through the second bracket and supports the rotation, and a mounting part that is mounted to the first member or the second member, with the shaft part and the mounting part being produced from a plate material.

2 Claims, 15 Drawing Sheets

(56) References Cited

U.S. PATENT DOCUMENTS

2007/0151080 A1* 7/2007 Lu et al. .................. 16/340
2009/0172916 A1* 7/2009 Chern ...................... 16/342
2010/0071162 A1* 3/2010 Wang ....................... 16/342

* cited by examiner

HINGE AND BRACKET FOR HINGE

FIELD OF THE INVENTION

The present invention relates to a hinge and brackets used for a hinge for connecting two members in such a way that one member (a cover or the like) can rotate against the other member (a main body or the like), as are applied to household appliances, mobile phones, or OA equipment such as notebook computers that are structured to open and close.

BACKGROUND OF THE INVENTION

For example, a notebook computer 100 as shown in FIG. 25 includes a first member (a main body) 120 that is provided with a keyboard 110 and other operation keys, and a second member (a cover) 140 that is provided with a liquid crystal display 130, with the two members connected via hinge parts 150. In this structure, the second member 140 rotates on the hinge parts 150 in the directions of the arrows, whereby the second member 140 is opened or closed. Accordingly, operation of the first member 120 is possible while the second member 140 is in an open condition. In this kind of equipment, it is required that the hinge parts 150 connect the second member 140 with the first member 120 so that the second member 140 can be opened or closed, and so that the second member 140 can be maintained at an appropriate open angle in a partially open condition. For satisfying these requirements, hinges have been developed in the past. (For example, see Patent Documents 1 and 2.)

FIGS. 26-28 show a prior hinge that includes a bracket 210 that is mounted to a first member 120, a shaft 220 that is mounted to a second member 140, a friction plate 230, and a disc spring 240.

As shown in FIGS. 26 and 29, the bracket 210 is formed by a pressed plate-like member that includes a mounting plate part 211 that is fixed to the first member 120, and a bearing plate part 212 that rises from the mounting plate part 211. The bearing plate part 212 supports the shaft 220, and has a circular axial hole 214 through which the shaft 220 penetrates. The bracket 210 is rotatable against the shaft 220, and therefore the rotation of the bracket 210 causes the rotation of the second member 140.

As shown in FIGS. 26 and 30, the shaft 220 includes a mounting part 221 that is fixed to the second member 140, and a spindle part 222 that extends from the mounting part 221 in the axial direction of the mounting part 221. The spindle part 222 penetrates through the axial hole 214 of the bracket 210 and is connected to the bracket 210 in such a way that the spindle part 222 can rotate against the bracket 210. The spindle part 222 is noncircular by being cut in such a way that both sides of the cross-section are parallel to each other, so as to support the friction plate 230, the disc spring 240, and a washer 250 under a rotation-restraining condition.

The friction plate 230 is mounted to the shaft 220 in such a way that the surface of the friction plate 230 contacts the surface of the bearing plate part 212 of the bracket 210. As shown in FIGS. 26 and 31, the friction plate 230 has an axial hole 231 through which the spindle part 222 of the shaft 220 penetrates. The axial hole 231 is non-circular so as to correspond to the shape of the spindle part 222 of the shaft 220, and the friction plate 230 is supported by the spindle part 222 of the shaft 220 under a rotation-restraining condition.

The disc spring 240 is supported by the spindle part 222 of the shaft 220 under a rotation-restraining condition, as is similar to the friction plate 230. Moreover, the washer 250 is arranged behind the disc spring 240, and the tip of the spindle part 222 of the shaft 220 (the tip of the spindle part 222 is behind the washer 250) is caulked and plastically deformed, so that the disc spring 240 is compressed. Because the disc spring 240 presses the friction plate 230 in the axial direction, friction torque Tm in the rotational direction (see FIG. 28) is generated between the friction plate 230 and the bearing plate part 212 of the bracket 210, whereby the shaft mounting part 221 (the second member 140) can be stopped at a specified angle.

PRIOR ART DOCUMENTS

Patent Documents

Patent Document 1: Japanese Unexamined Patent Application Publication No. 2008-20033
Patent Document 2: Japanese Patent No. 3732619

GENERAL DESCRIPTION OF THE INVENTION

Problems to be Solved by the Invention

In the prior-art hinge, the shaft 220 is manufactured by cutting or forging, and the spindle 222 that supports the friction plate 230, the disc spring 240, and the washer 250 are required to be non-circular. Accordingly, the shaft 220 has a complex shape, and therefore manufacturing the shaft 220 by cutting involves such problems as troublesome processing, the need for long machining time, and increased cost of processing. Also, even if the shaft 220 is manufactured by forging, undercut portions such as threaded holes are required to be manufactured by cutting, and therefore the manufacturing of the forged device is similarly troublesome, and long machining time is required.

The above prior-art hinge has the problems that the manufacturing of the shaft 220 having a complex shape is troublesome, and long machining time is required. One objective of the present invention is to provide a hinge and brackets for the hinge that are manufactured easily in a short time, so that the above problems can be solved.

Means for Solving the Problems

The hinge described in Claim 1, which rotatably connects a first member and a second member, includes (1) two brackets that are can rotate against each other and that are mounted to either of the first member and the second member, respectively, and (2) a friction-torque-generating member that directly or indirectly presses the two brackets so as to generate friction torque. One of said brackets includes (1) a shaft part that penetrates through the other bracket so as to support the rotation of the other member, and (2) a mounting part to be mounted to the first member or the second member. The shaft part and the mounting part constitute a one-piece structure provided by forming a plate.

The hinge described in Claim 2 is the hinge described in Claim 1, and one of the brackets has a one-piece structure provided by press-forming the plate.

The hinge described in Claim 3 is the hinge described in Claim 1 and Claim 2, and the shaft part penetrates through the friction-torque-generating member.

The hinge described in Claim 4 is the hinge described in any of Claims 1-3, and cam surfaces, which generate self-rotation torque when the brackets rotate against each other, are provided between the aforementioned [in Paragraph 0011] other bracket and the friction-torque-generating member.

The hinge described in Claim 5 is the hinge described in any of Claims 1-4, and the friction-torque-generating member includes an elastic member directly or indirectly pressing the two brackets in the shaft part's axial direction.

The hinge described in Claim 6 is the hinge described in any of Claims 1-4, and the friction-torque-generating member includes a friction member disposed between the two brackets so as to contact the two brackets. Elastic members press against each other and hold between them the two brackets and the friction member in the axial direction of the shaft part.

The bracket described in Claim 7 is mounted to either the first member or the second member, each of which is connected so as to rotate against the other, and said bracket holds the rotation angle between the first member and the second member due to friction torque generated by a friction-torque-generating member. The bracket includes a mounting part mounted to either the first member or the second member, and a shaft part mounted to the other member so as to penetrate through the bracket, and the shaft part and the mounting part constitute a one-piece structure provided by being formed from a plate material.

The bracket for the hinge described in Claim 8 is the bracket described in Claim for a hinge 7, and the bracket has a one-piece structure provided by being formed from a plate material.

Effects of the Invention

In the present invention, the first bracket that has a shaft part is formed by press-forming a plate material, and therefore by only changing the press die it is possible to form a shaft part that has a cross-section of a different, non-circular shape. Accordingly, the present invention offers not only increased design freedom but also easy manufacturing of the shaft part and shortening of the required time for said manufacturing.

BRIEF DESCRIPTIONS OF THE DRAWINGS

MODES FOR CARRYING OUT THE INVENTION

The embodiments of the present invention will be explained below, referring to the accompanying drawings. Also, for the sake of consistency, the same number is given to each corresponding part in the embodiments.

First Embodiment

Figure 1:
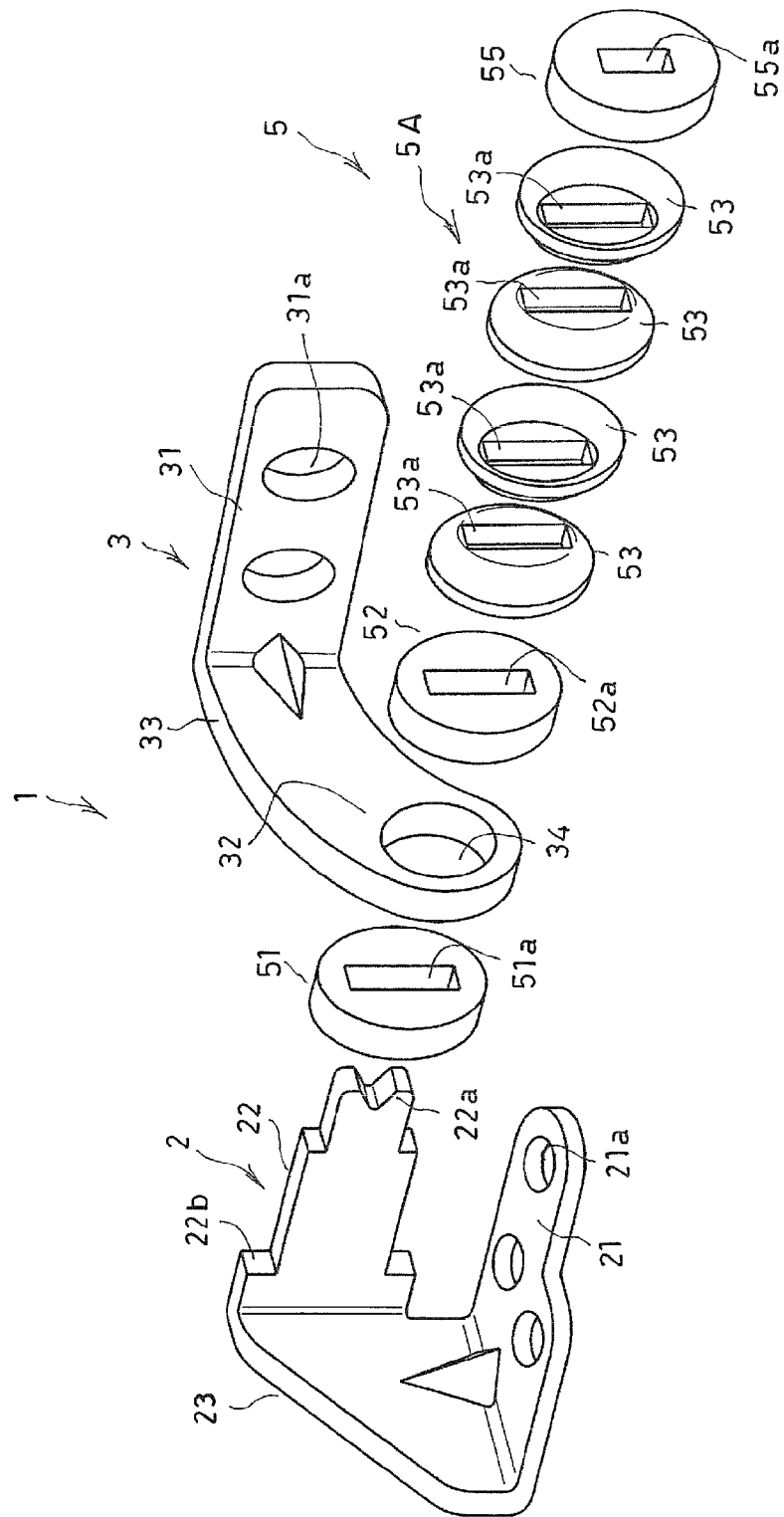
FIG. 1 is an exploded-perspective view showing the entire hinge of the First Embodiment of the present invention.
Figure 2:
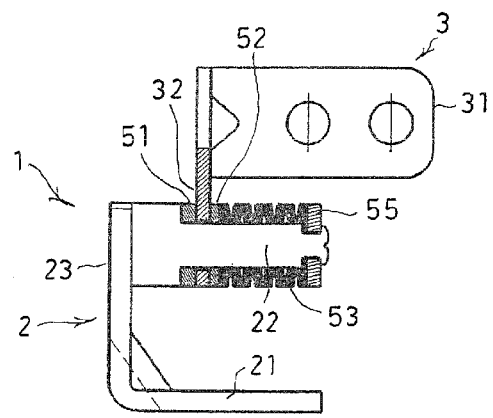
FIG. 2 is a cross-sectional view of the hinge of the First Embodiment.
Figure 3:
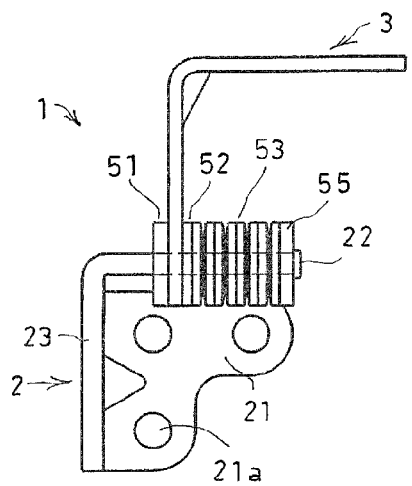
FIG. 3 is a front view of the hinge of the First Embodiment.
Figure 4:
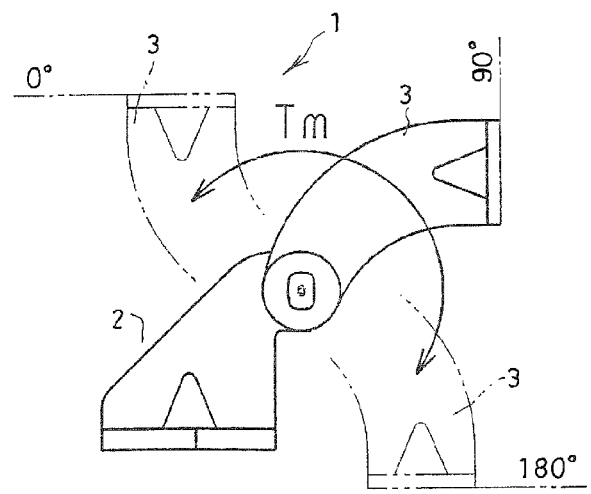
FIG. 4 is a side view showing the operation of the hinge of the First Embodiment.

FIGS. 1-11 shows a hinge 1 of the First Embodiment of the present invention, of which FIG. 1 is an exploded-perspective view, FIG. 2 is a cross-sectional view, and FIG. 3 is a front view. FIG. 4 is a side view showing the operation of the hinge 1.

Figure 25:
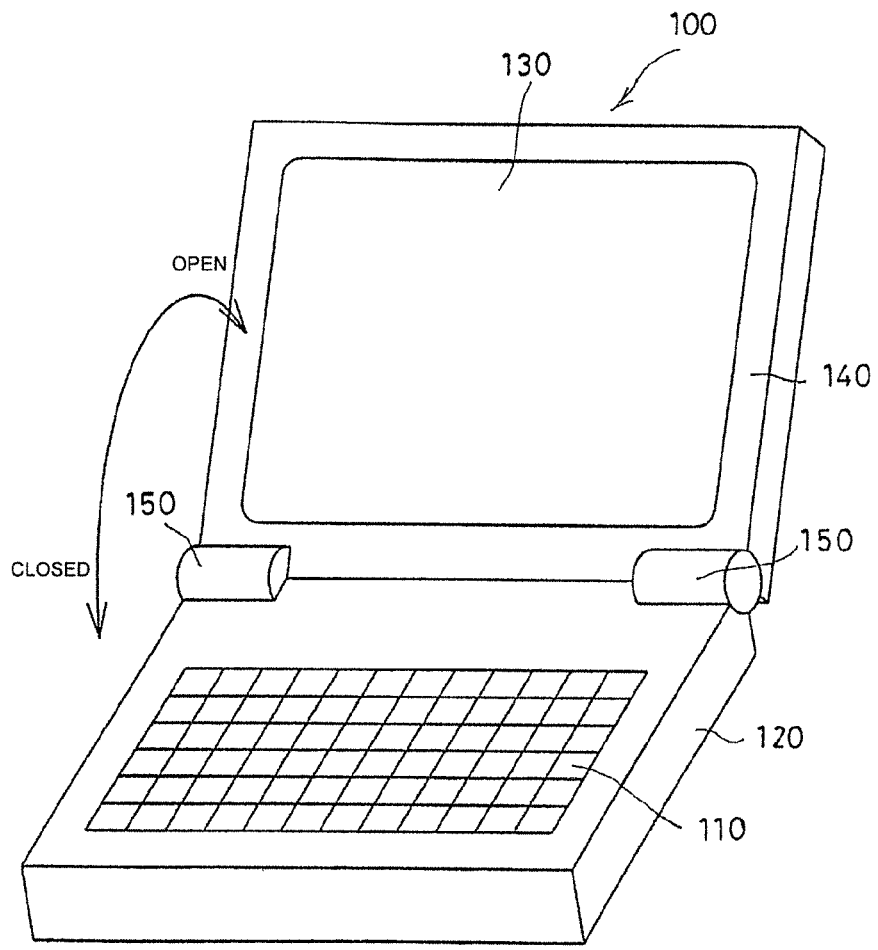
FIG. 25 is a perspective view of a notebook computer.
Figure 26:
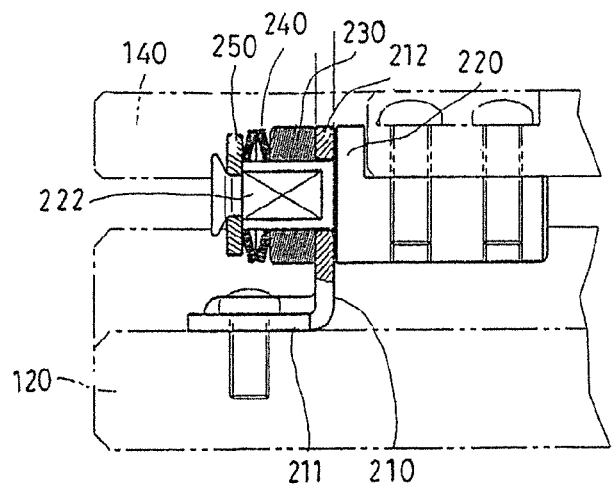
FIG. 26 is a front view of the prior hinge.
Figure 27:
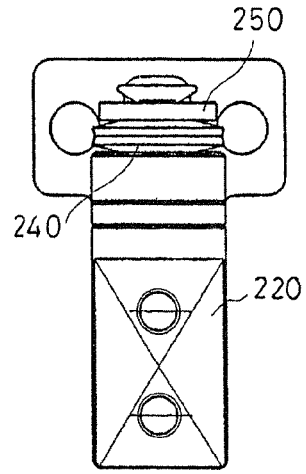
FIG. 27 is a plan view of the prior hinge.
Figure 28:
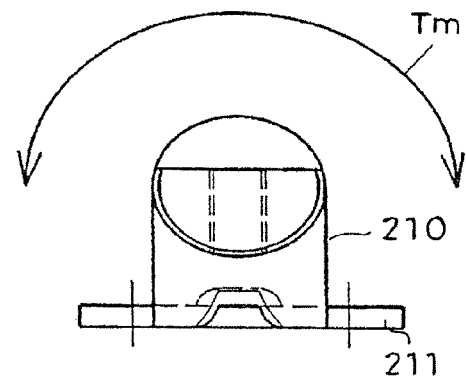
FIG. 28 is a side view showing the operation of the prior hinge.
Figure 29:
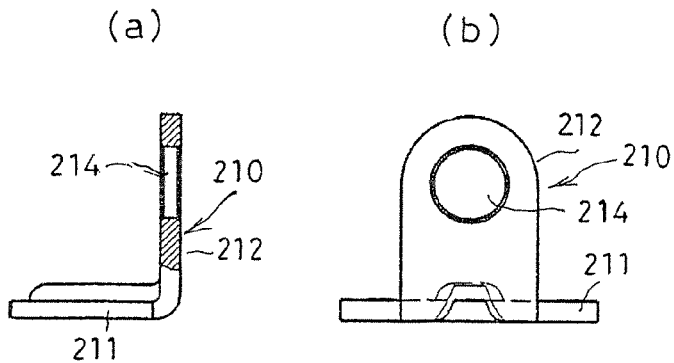
FIG. 29 (*a*) is a front view, and FIG. 29 (*b*) is a side view of the second bracket used in the prior hinge, respectively.
Figure 30:
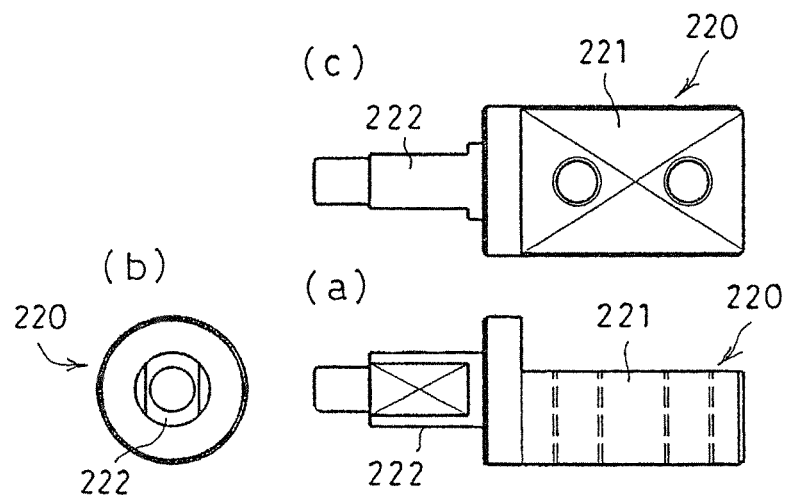
FIG. 30 (*a*) is a front view, FIG. 30 (*b*) is a side view, and FIG. 30 (*c*) is a plan view of a shaft used in the prior hinge, respectively.
Figure 31:
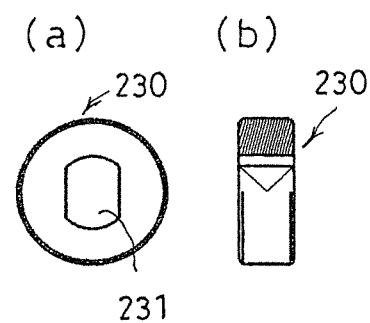
FIG. 31 (*a*) is a side view, and FIG. 31 (*b*) is a partially broken-away front view of a friction plate used in the prior hinge, respectively.

As shown in FIGS. 1-4, the hinge 1 of this embodiment includes a first bracket 2, a second bracket 3, and a friction-torque-generating member 5. The hinge 1 is applied, for example, to the notebook computer 100 shown in FIG. 25. In FIG. 25, the notebook computer 100 includes a first member (a main body) 120 that is provided with a keyboard 110 and other operation keys, and a second member (a cover) 140 that is provided with a liquid crystal display 130. The two members are connected via hinge parts 150. In this notebook computer 100, the rotation of the second member 140 in the directions of the arrows causes the opening and closing of the second member 140 that rotates on the hinge parts 150. Accordingly, operations to the first member 120 are made possible while the second member 140 is in an open condition. The hinge 1 of the present invention is arranged at the hinge parts 150.

The first bracket 2 of the hinge 1 of this embodiment can be mounted to either the first member 120 or the second member 140, and the second bracket 3 can be mounted to the other member of the first member 120 or the second member 140. This allows the hinge 1 to connect the first member 120 and the second member 140 in such a way that either member can rotate against the other member. In this embodiment, the first bracket 2 is mounted to the first member 120, and the second bracket 3 is mounted to the second member 140, whereby the second member 140 is able to rotate. This makes it possible to adjust the angle of the second member against the first member.

Figure 5:
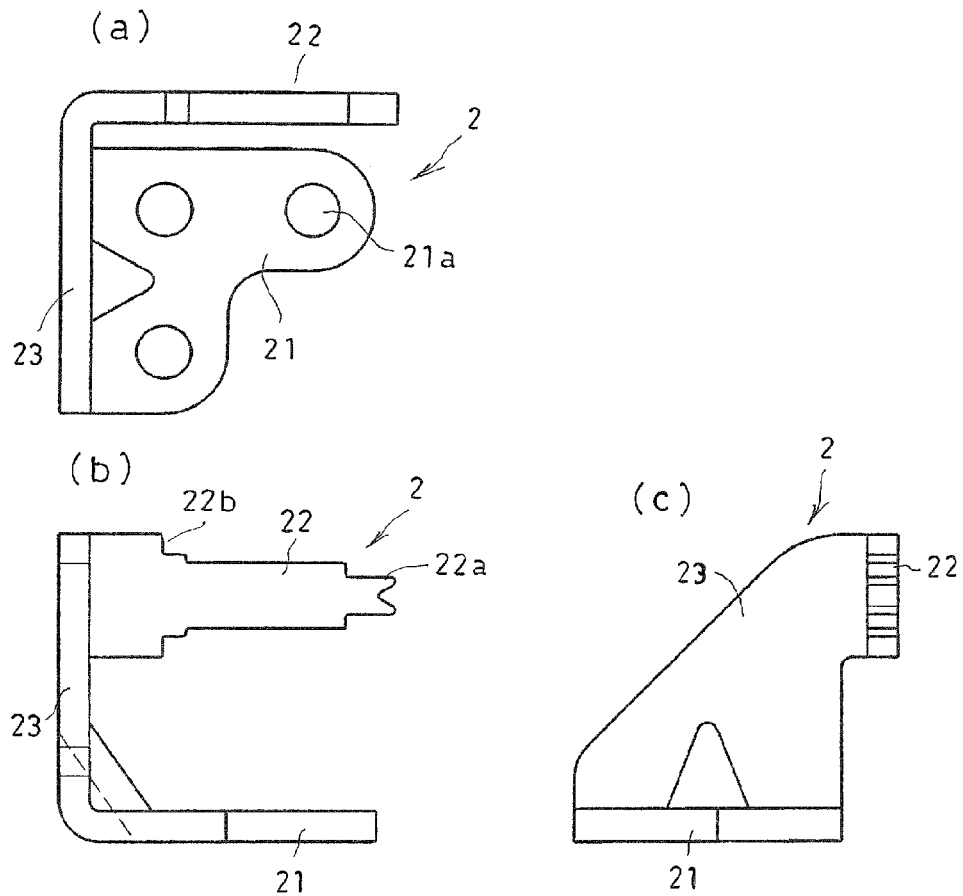
FIG. 5 (*a*) is a plan view, FIG. 5 (*b*) is a front view, and FIG. 5 (*c*) is a side view of the first bracket of the First Embodiment, respectively.

FIG. 5 shows the first bracket 2. The first bracket 2 includes a mounting part 21, a shaft part 22, and a connecting part 23. The mounting part 21, which is a flat-plate, is mounted to either the first member 120 or the second member 140 by fixing screws or the like, and threaded holes 21a through which fixing screws penetrate through the mounting part 21 in the plate-thickness direction [i.e., orthogonal/perpendicular to the surface of the plate.]. The connecting part 23, which rises from one end of the mounting part 21 in a flat shape, connects the mounting part 21 and the shaft part 22.

The shaft part 22 is bent so as to make a right angle with the connecting part 23, so that the shaft part 22 becomes approximately parallel to one edge of the mounting part 21. In this embodiment, the shaft part 22 is bent so as to make an angle with the connecting part 23, so that the shaft part 22 extends in the same direction as the mounting part 21. The shaft part 22 is formed so as not to be cylindrical but so as to be flat with a rectangular cross-section (see FIG. 1). Accordingly, this shaft part 22 has a non-cylindrical cross-section. This shaft part 22 has a long and narrow flat shape and its width varies along the length direction of the shaft part 22. In this instance, the shaft part 22 has a staircase shape, wherein its width is largest at the side of the connecting part and becomes narrower in a stepwise manner towards the tip part 22a. The tip part 22a has an approximately V-shaped notch part. Also, shoulders 22b are formed at the side of the connecting part 23 (the base side) of the shaft part 22 (see FIG. 5(b)).

Figure 6:
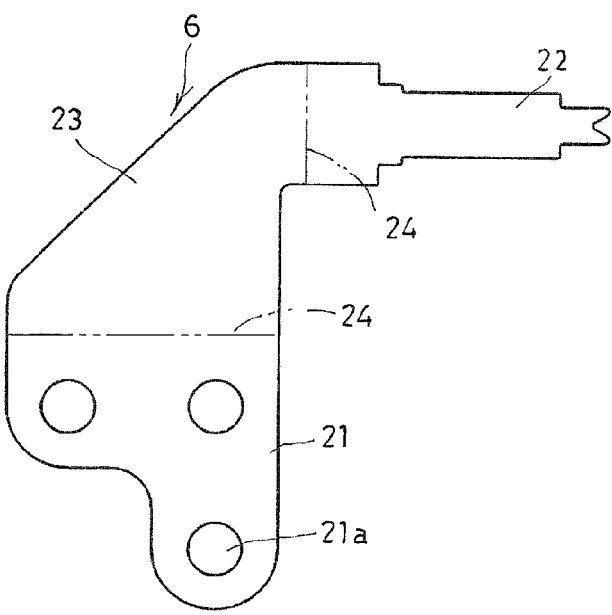
FIG. 6 is a plan view of the original plate for forming the first bracket.

The first bracket 2 is made of a plate material by press-forming the material. Metallic materials such as SUS304 or SAE 1060 can be used as the plate material. The thickness of the metallic material is preferably 1-3 mm, but is not limited thereto. The flat original bracket plate 6 shown in FIG. 6 is formed by being stamped out from this type of plate material, and then the original bracket plate 6 is press-formed by a press die, and then press-folded along folding lines 24 shown by the dashed double-dotted lines. Thus, the first bracket 2 is formed as a one-piece structure consisting of the mounting part 21, shaft part 22, and connecting part 23 formed in a unified manner.

Figure 7:
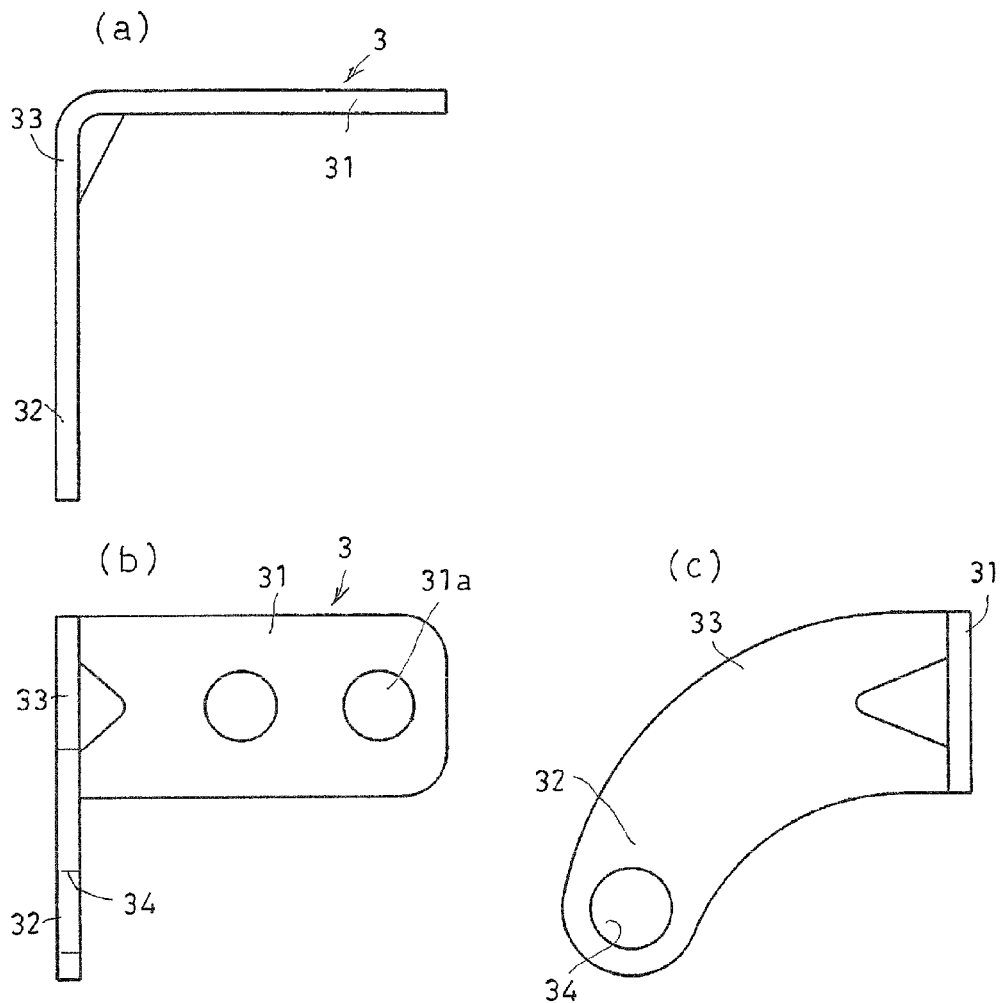
FIG. 7 (*a*) is a plan view, FIG. 7 (*b*) is a front view, and FIG. 7 (*c*) is a side view of the second bracket of the First Embodiment, respectively.

FIG. 7 shows the second bracket 3, which includes a mounting part 31, a bearing part 32, and a connecting part 33. The mounting part 31 is mounted to either the first member 120 or the second member 140 by a screw or the like. When the first bracket 2 is fixed to the first member 120, the mounting part 31 is mounted to the other member than the first member 120 (i.e., the second member 140), and when the first bracket 2 is fixed to the second member 140, the mounting part 31 is mounted to the other member than the second member 140 (i.e., the first member 120). The mounting part 31 is flat, and threaded holes 31 through which fixing screws penetrate pass through the mounting part 31 in the plate-thickness direction. The connecting part 33, which is bent at the other end of the mounting part 31 so as to make a right angle with the mounting part 31, connects the mounting part 31 and the bearing part 32.

The mounting part 31 is provided at one end of the connecting part 33, and the bearing part 32 is provided at the other end of the connecting part 33. An axial hole 34, through which the shaft part 22 of the first bracket 2 penetrates, is provided in the thickness direction of the bearing part 32. The axial hole 34 is round, having a diameter of a size through which the shaft part 22 can penetrate, and when the shaft part 22 penetrates through the axial hole 34 the second bracket 3 can rotate on the shaft part 22 of the first bracket 2 against the first bracket 2. This enables the second bracket 3 to rotate against the first bracket 2 within the range of 0°-180°, as shown in FIG. 4. The above-mentioned second bracket 3 can be formed by being stamped out from a plate material and then being press-formed by a press die, as is similar to the first bracket 2. Metallic materials such as SUS304 or SAE 1060 can be used as a plate material for the second bracket 3, and the thickness of the plate material is appropriately 1-3 mm.

The friction-torque-generating member 5 includes a first friction member 51, a second friction member 52, and a plurality of disc springs 53 as an elastic member 5A. The shaft part 22 of the first bracket 2 penetrates through each member of the friction-torque-generating member 5. This penetration allows the entire friction-torque-generating member 5 to be mounted to the first bracket 2. The first friction member 51 of the friction-torque-generating member 5 is arranged between the first bracket 2 and the second bracket 3, and the second friction member 52 is arranged so that the bearing part 32 is held between the first friction member 51 and the second friction member 52.

Figure 8:
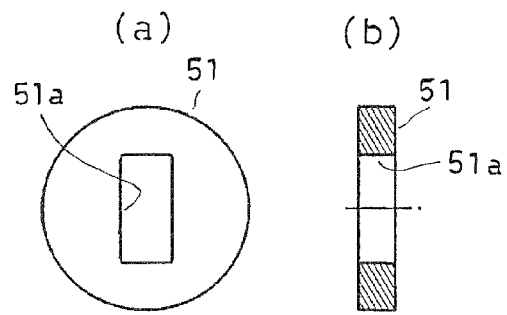
FIG. 8 (*a*) is a side view, and FIG. 8 (*b*) is a cross-sectional view of a first friction member, respectively.

FIG. 8 shows the first friction member 51, which is circular and has two flat outer surfaces that are parallel to each other. At the center of the first friction member 51 is an axial hole 51a through which the shaft part 22 of the first bracket 2 penetrates in the thickness direction of the first friction member 51. The threaded hole 51a is rectangular so as to correspond to the shape of the shaft part 22. That is, the threaded hole 51a is non-circular. The shaft part 22 of the first bracket 2 penetrates through the threaded hole 51a so as to be fitted to the threaded hole 51a, and this penetration allows the first friction member 51 to be mounted to the shaft part 22 under a rotation-restraining condition. At this time, the first friction member 51 contacts the shoulders 22b of the shaft part 22, whereby the first friction member 51 is fixed in the length direction of the shaft part 22. The outer surface of this first friction member 51 makes surface-to-surface contact with the bearing part 32 under a rotation-restraining condition.

Figure 9:
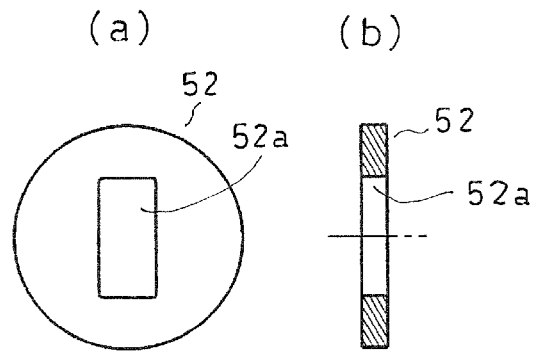
FIG. 9 (*a*) is a side view, and FIG. 9 (*b*) is a cross-sectional view of a second friction member, respectively.

FIG. 9 shows the second friction member 52, which is circular and has two flat outer surfaces parallel with each other. An axial hole 52a through which the shaft part 22 of the first bracket 2 penetrates is provided in the thickness direction of the second friction member 52 The axial hole 52a is rectangular so as to correspond to the shape of the shaft part 22. That is, the axial hole 52a is formed into a non-circular shape as is similar to the axial hole 51a of the first friction member 51. After the first friction member 51 and the second bracket 3 are mounted to the shaft part 22 of the first bracket 2, the second friction member 52 is mounted to the first bracket 2 by the shaft part 22 that penetrates through the axial hole 52a of the second friction member 52 so as to be fitted to the axial hole 52a. This second friction member 52 is mounted to the shaft part 22 by making surface-to-surface contact with the bearing part 32 of the second bracket 3 under a rotation-restraining condition.

Figure 10:
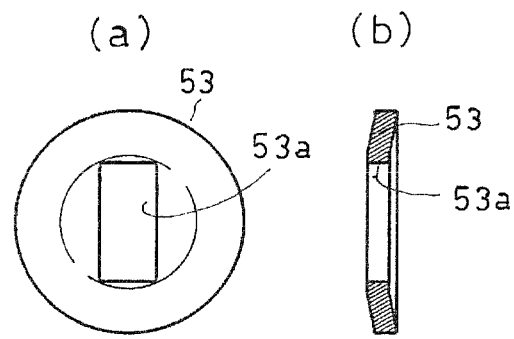
FIG. 10 (*a*) is a side view, and FIG. 10 (*b*) is a cross-sectional view of a disc spring, respectively.

FIG. 10 shows one of the disc springs 53 that form an elastic member 5A, wherein each of the disc springs 53 has an axial hole 53a at its center, the axial hole 53a being non-circular so as to correspond to the shape of the shaft part 22 of the first bracket 2. These disc springs 53 are arranged behind the second friction member 2 so that they are disposed one upon the other and are mounted to the shaft part 22 under a rotation-restraining condition after the shaft part 22 of the first bracket 2 penetrates through the axial hole 53a. The number of the disc springs 53 and the direction in which those springs are disposed can be determined as appropriate.

Figure 11:
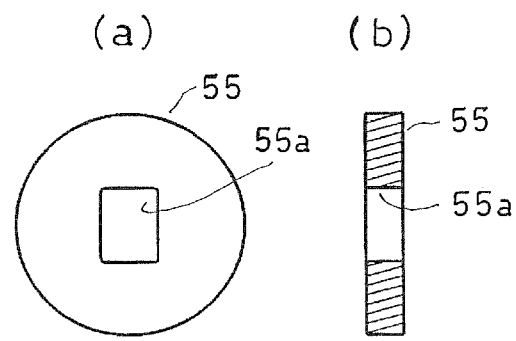
FIG. 11 (*a*) is a side view, and FIG. 11 (*b*) is a cross-sectional view of a washer, respectively.

A washer 55 is arranged beside the disc springs 53, which are disposed one upon the other. FIG. 11 shows the washer 55, which is circular and has an axial hole 55a at its center, the axial hole 55a being non-circular so as to correspond to the shape of the shaft part 22 of the first bracket 2. The washer 55 is mounted to the shaft part 22 under a rotation-restraining condition after the disc springs 53 are arranged to the shaft 22. This prevents the disc springs 53 from being detached. Also, after the washer 55 is arranged, the notch at the tip part 22a of the shaft 22 of the first bracket 2 is plastically deformed so that the notch is widened. Because this plastic deformation causes the disc springs 53 to bend, an axial force along the shaft part 22 is generated. This axial force generates friction torque Tm between each of the friction members 51, 52, which contacts the bearing part of the second bracket 3, and the bearing part 32 of the second bracket 3 (see FIG. 4). Accordingly, if the second bracket 3 is rotated against the first bracket 2 within the range of 0°-180°, and then the force to rotate the second bracket 3 is removed, the second bracket 3 stops due to the friction torque Tm at the position of the angle by which the second bracket 3 is rotated. Therefore, the member to which the second bracket 3 (the second member 140 of this embodiment) is mounted can be stopped at a specified angle.

According to the above embodiment, because the entire first bracket 2, including the mounting part 21 and the shaft part 22, is formed as a one-piece structure made by press-forming a plate material, the first bracket 2 alone can achieve the following: (a) being mounted to the first member 120 or the second member 140; (b) holding the second bracket 3; (c) holding the first friction member 51, the second friction member 52, the disc springs 53, and the washer 55 under a rotation-restraining condition; (d) applying an axial force to the first friction member 51, the second friction member 52, the disc springs 53, and the washer 55; and (e) generating friction torque. Therefore, the total number of parts required for making a hinge can be reduced.

Although the shaft part 22 of the first bracket 2 is flat and has a rectangular cross-section, because the first bracket 2 is formed by press-forming a plate material, the cross-sectional shape of the shaft part 22 can be changed to another non-circular shape just by replacing the press die with another die having a different shape, which increases design freedom and ease of manufacturing the shaft part 22, so that the required time for manufacturing is shortened. Similarly, the length of the shaft part 22 can easily be changed. Moreover, because the first bracket 2 is formed by press work using a press die, the bracket made by press work can be produced in a larger quantity than can a bracket made by cutting work in the same manufacturing condition, as a result of which the manufacturing cost can be decreased.

Figure 12:
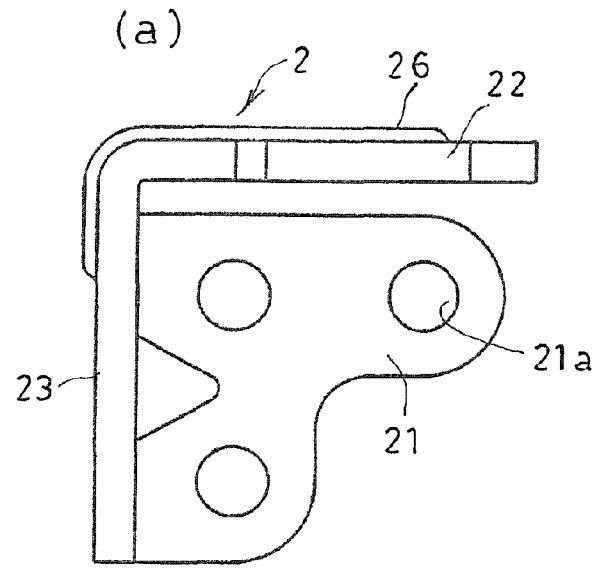
FIG. 12 (*a*) is a plan view, FIG. 12 (*b*) is a front view, and FIG. 12 (*c*) is a cross-sectional view of the line E-E of a modification of the first bracket of the First Embodiment, respectively.
Figure 12:
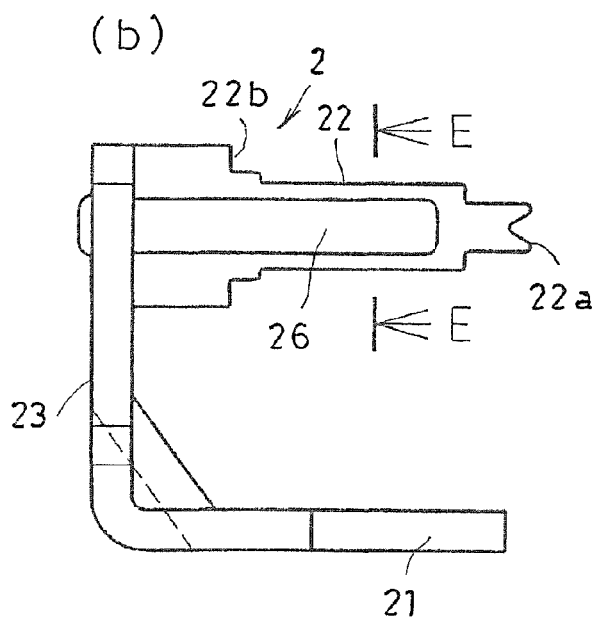
Figure 12:
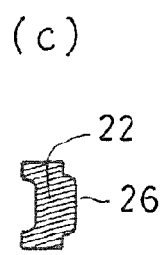
Figure 13:
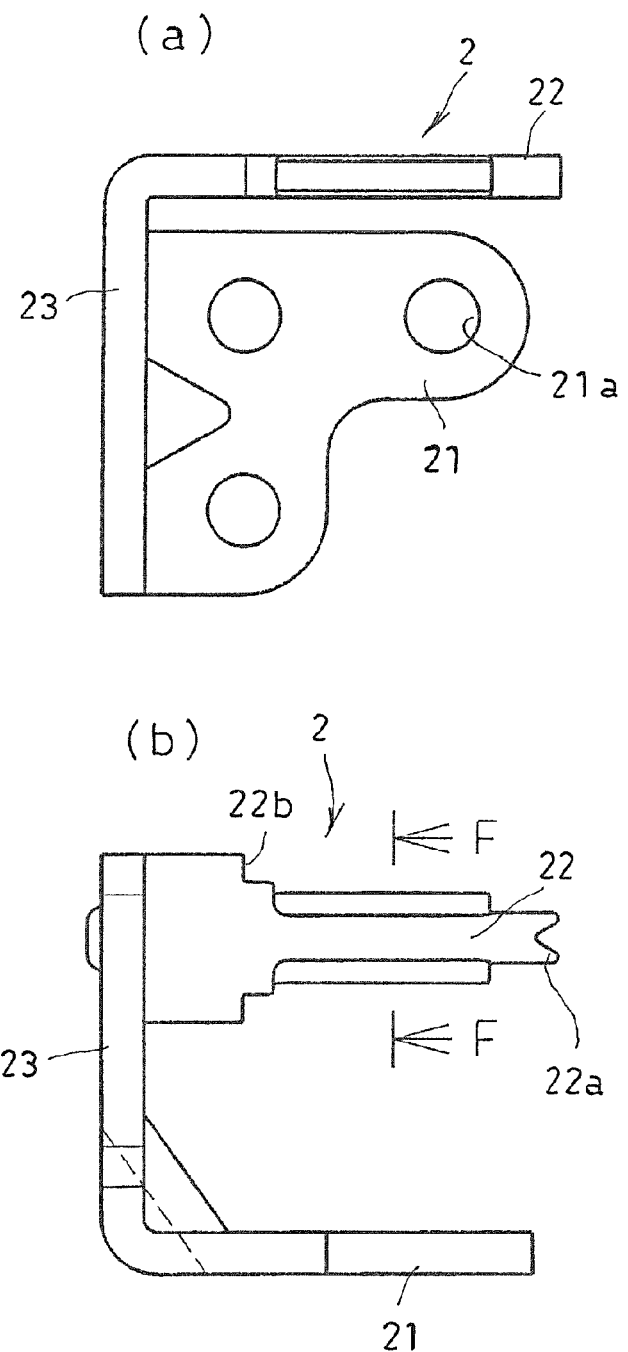
FIG. 13 (*a*) is a plan view, FIG. 13 (*b*) is a front view, and FIG. 13 (*c*) is a cross-sectional view of the line F-F of a further modification of the first bracket of the First Embodiment, respectively.

FIGS. 12 and 13 show a modification of the First Embodiment. The shaft part 22 of the first bracket 2 of the embodiment shown in FIG. 12 includes a rib 26. The rib 26 is formed in the axial direction of the shaft part 22. The forming of the rib 26 is easily made because the rib 26 can be formed by pressing in one direction at the same time that the first bracket 2 is press-formed. The forming of this rib 26 can provide additional strength to the shaft part 22, so that deformation of the shaft part 22 can be prevented.

The embodiment shown in FIG. 13 provides rounding to the shaft part 22. Although the shaft part 22 is formed so as to have a rectangular cross-section, rounding the four corners of the shaft part 22 can facilitate smooth contact between the shaft part 22 and the second bracket 3, so that the second bracket 3 can be rotated more smoothly. This enables the second bracket 3 to more smoothly adjust its angle.

Second Embodiment

Figure 14:
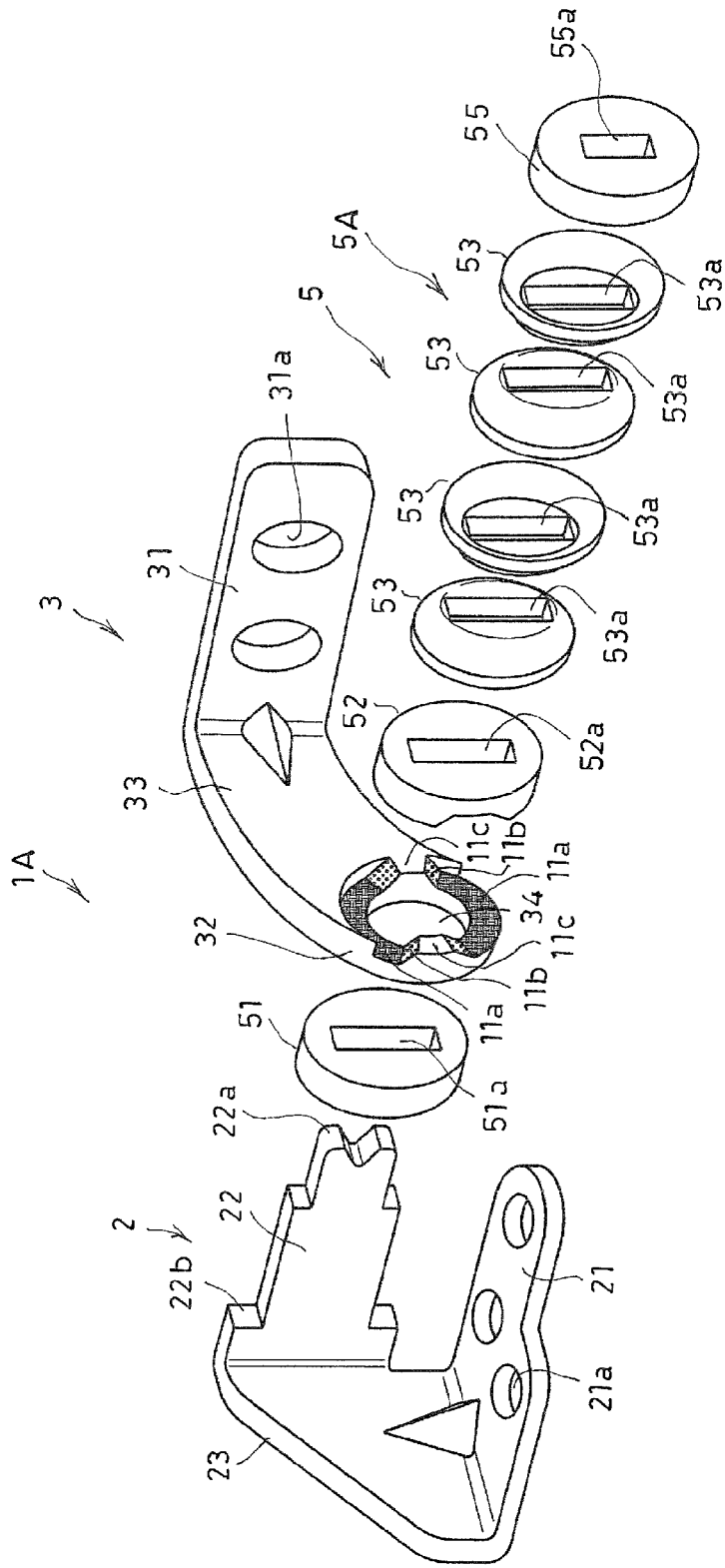
FIG. 14 is an exploded-perspective view showing the entire hinge of the Second Embodiment.
Figure 15:
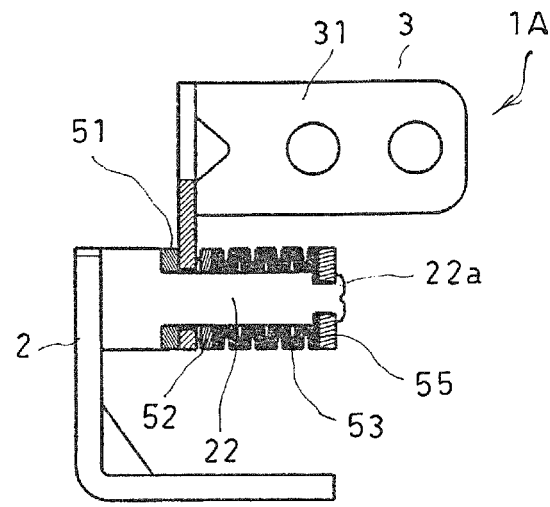
FIG. 15 is a cross-sectional view showing the entire hinge of the Second Embodiment.
Figure 16:
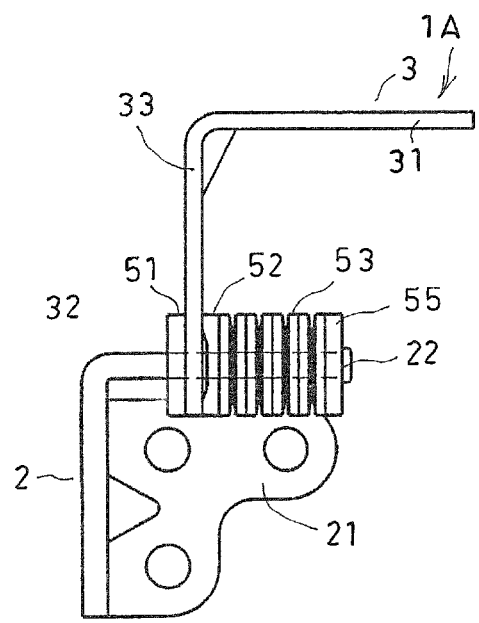
FIG. 16 is a plan view showing the entire hinge of the Second Embodiment.
Figure 17:
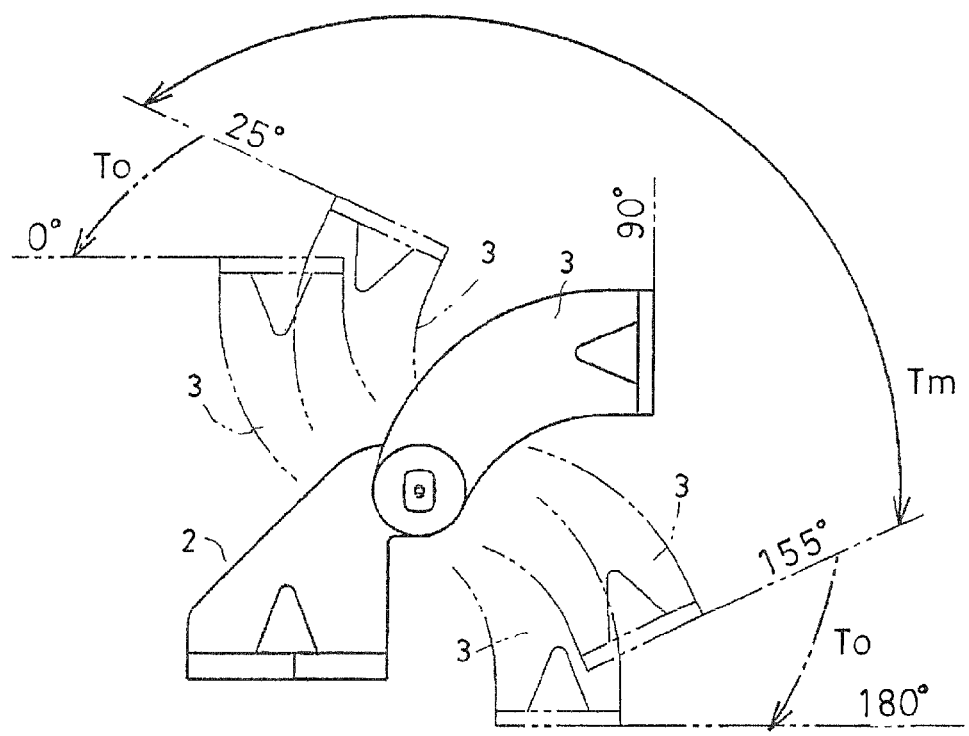
FIG. 17 is a side view showing the operation of the hinge of the Second Embodiment.

FIGS. 14-19 show the hinge 1A of the Second Embodiment of the present invention. FIG. 14 is an exploded-perspective view, FIG. 15 is a cross-sectional view, and FIG. 16 is a front view of the entire hinge 1A, respectively, and FIG. 17 is a side view showing the operation of the hinge 1A.

In this hinge 1A of the Second Embodiment, a cam surface 11 is formed on the second bracket 3, and a cam surface 12 that corresponds to the cam surface 11 is formed on the second friction member 52. In other respects, the structure of the hinge 1A is the same as that of the hinge 1 of the First Embodiment.

Figure 18:
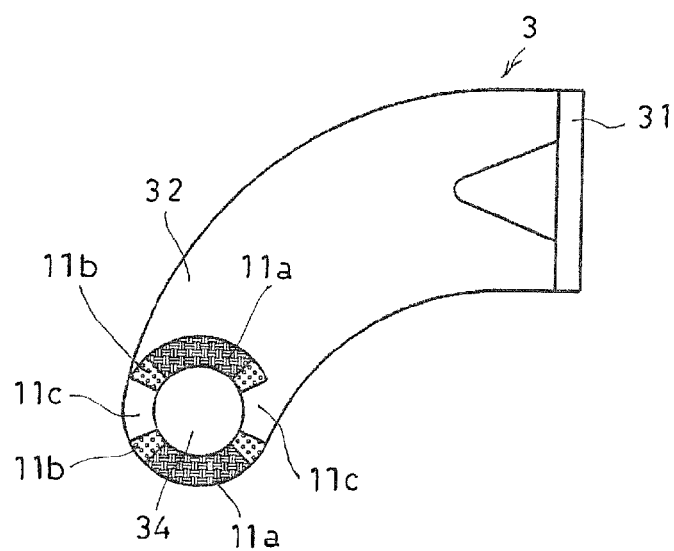
FIG. 18 is a front view of the second bracket of the Second Embodiment.

The cam surface 11 is provided at the surrounding part of the axial hole 34 of the bearing part 32 of the second bracket 3. As shown in FIG. 18, the cam surface 11 consists of (1) concave portions 11a whose surface levels are lower than that of the surrounding part of the bearing part 32, (2) convex portions 11c, whose surface levels are equal to that of the bearing part 32, and sloped potions 11b that connect the concave portion 11a and the convex portion 11c.

Figure 19:
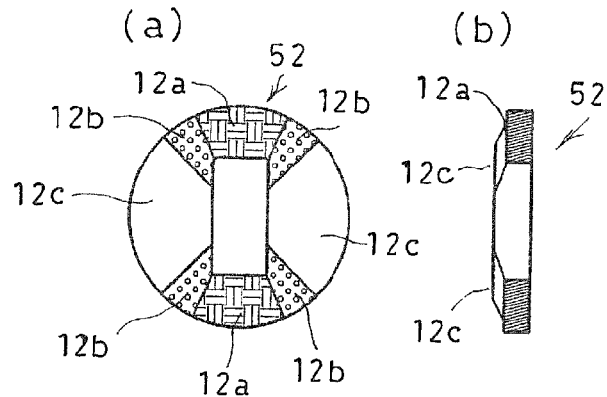
FIG. 19 (*a*) is a side view, and FIG. 19 (*b*) is a cross-sectional view of a second friction member of the Second Embodiment, respectively.

In contrast, the cam surface 12 is formed on the surface of the second friction member 52 so that the cam surface 12 is opposed to the cam surface 11 of the bearing part 32. As shown in FIG. 19, the cam surface 12 is provided at the surrounding part of the axial hole 52a of the second friction member 52. The cam surface 12 consists of (1) concave portions 12a whose surface levels are lower than that of the surrounding part of the second friction member 52, (2) convex portions 12c, whose surface level is higher than that of the concave portions 12a, and (3) sloped potions 12b that connect the concave portion 12a and the convex portion 12c.

The cam surfaces 11 and 12 are designed to fit each other, and the rotation of the second bracket 3 against the first bracket 2 allows those cam faces to engage with, and disengage from, each other. This engagement and disengagement enables the second bracket 3 (the second member 140) to rotate alone. Accordingly, as shown in FIG. 17, the rotation torque TO is designed so as to be generated in the neighborhood of the angle of the fully-closed position (25°-0°) and in the neighborhood of the fully-open position (155°-180°) of the second member 140. Accordingly, the second member can rotate so as to execute opening and closing movements within the ranges of the just-before-fully-closed position to the fully-closed position and the just-before-fully-open position to the fully-open position.

In this embodiment, because the cam surfaces 11 and 12 that generate the rotation torque TO are provided, the second member 140, which is a cover, automatically executes opening and closing movements within the predetermined angle ranges, which increases the operability of apparatuses to which this embodiment can be applied. Also in this embodiment, the second member (the second bracket 3) can be held at a specified angle due to the friction torque Tm, generated by the friction-torque-generating member 5, within the angle range of 155°-25°, which is beyond the above predetermined angle ranges, as is similar to the First Embodiment. Other functions and effects of this embodiment are similar to those of the First Embodiment. In addition, the cam surface 12 can be formed on the surface of the first friction member 51 instead of on the second friction member 52, so that the cam surface 12 is opposed to the surface of the second bracket 3.

Third Embodiment

Figure 20:
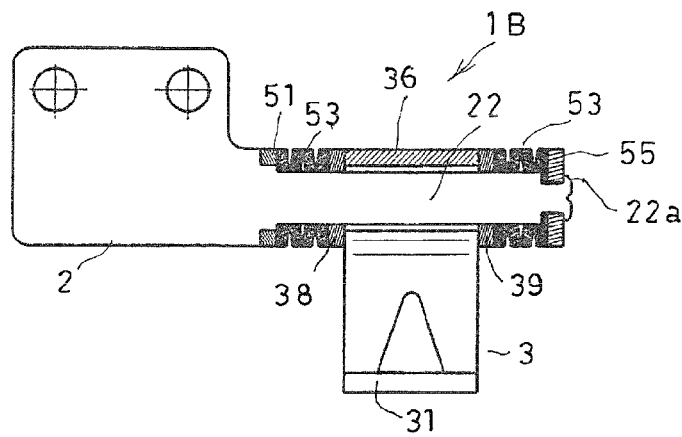
FIG. 20 is a cross-sectional view of the hinge of the Third Embodiment.
Figure 21:
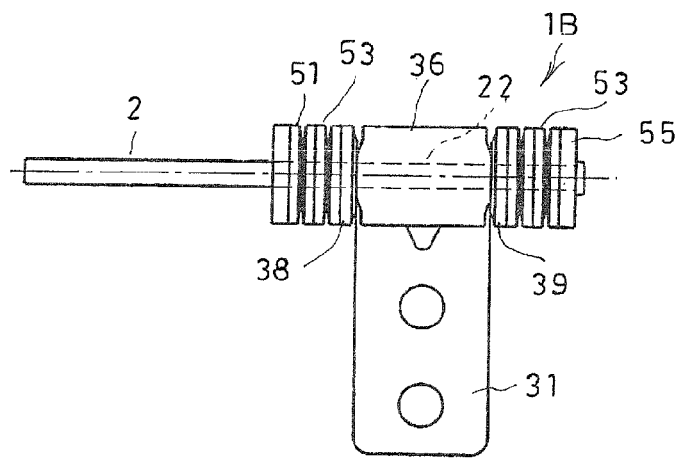
FIG. 21 is a plan view of the hinge of the Third Embodiment.
Figure 22:
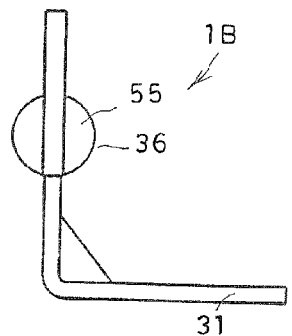
FIG. 22 is a side view of the hinge of the Third Embodiment.

FIGS. 20-24 show a hinge 1B of the Third Embodiment of the present invention, of which FIG. 20 is a cross-sectional view, FIG. 21 is plan view, and FIG. 22 is a side view, respectively.

In this embodiment, the second bracket 3 has cam surfaces on both of its sides, and the friction members that hold the second bracket 3 between them have also cam surfaces.

Figure 23:
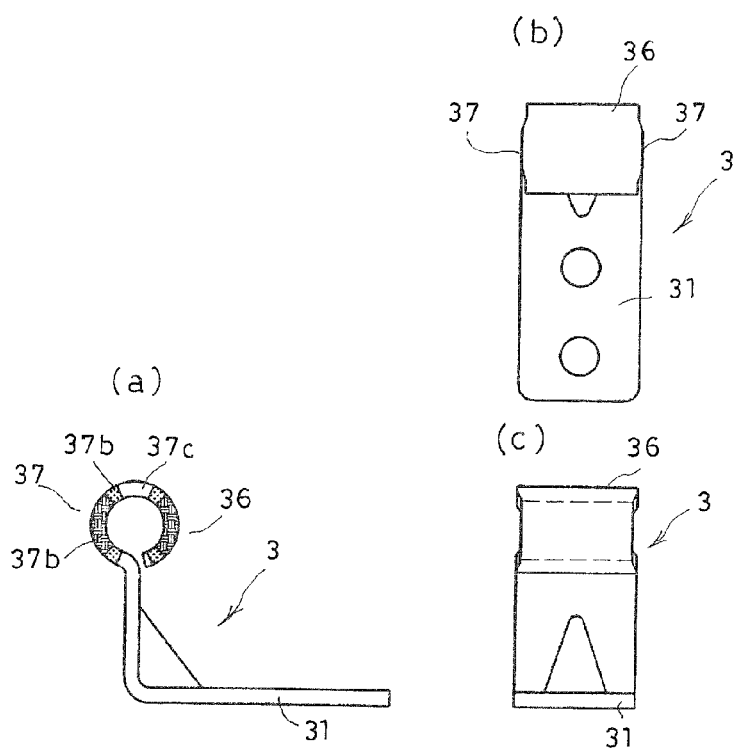
FIG. 23 (*a*) is a side view, FIG. 23 (*b*) is a plan view, and FIG. 23 (*c*) is a front view of the second bracket of the Third Embodiment, respectively.
Figure 24:
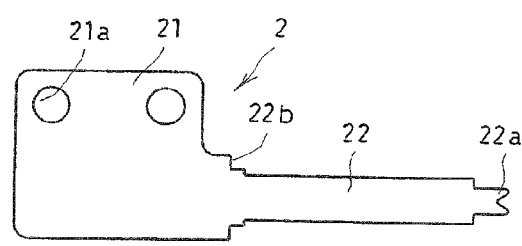
FIG. 24 is a front view of the first bracket of the Third Embodiment.

As shown in FIGS. 20-22 and more specifically in FIG. 23, the second bracket 3 includes a cylindrical bearing part 36 that is connected to a mounting part 31. The cylindrical bearing part 36 is tubular, and the non-circular shaft part 22 of the first bracket 2 penetrates through it. This penetration enables the second bracket 3 to rotate against the first bracket 2. Both end faces of the cylindrical bearing part 36 are provided with cam surfaces 37 that consist of concave portions 37a, convex portions 37c, and sloped portions 37b that connect the concave portions 37a and the convex portions 37c. Also in this embodiment, as shown in FIG. 24, the first bracket 2 includes a shaft part 22 that has a rectangular non-circular shape, and a flat mounting part 21 that is connected to the shaft part 22 in the length direction of the shaft part 22, whereby the entire first bracket 2 has a planar shape.

At both sides of the second bracket 3, plate-like friction members 38 and 39 are arranged so as to hold the second bracket 3 between them. At the outside of both of the friction members 38 and 39, a plurality of disc springs 53 are disposed as an elastic member 5A. Moreover, as shown in FIG. 20, at the outside of the left disc springs 53, a first friction member 51 is disposed, as is similar to the First Embodiment; and at the outside of the right disc springs 53, a washer 55 is disposed, as is similar to the First Embodiment. The tip part 22a of the shaft part 22 of the first bracket 2 is caulked and plastically deformed, so that the disc springs 53 are bent and an axial force is generated along the shaft part 22. This axial force is generated at both sides of the shaft part 22. Accordingly, when the second bracket 3 (the second member 140) is rotated, it can be held at a specified angle. Also, the shaft part 22 of the first bracket 2 penetrates through the above friction members 38, 39, disc springs 53, washer 55, and first friction member 51.

In this embodiment, although not shown, cam surfaces consisting of concave portions, convex portions, and sloped portions that are similar to the cam surfaces 37 formed on the cylindrical bearing part 36 are provided to the surfaces of the friction members 38, 39, with those surfaces being opposed to the cam surfaces 37 of the cylindrical bearing part 36. The cam surfaces 37 of both sides of the cylindrical bearing part 36 and the cam surfaces formed on the surfaces of the friction members 38, 39 are designed so as to fit each other, so that the rotation of the second bracket 3 against the first bracket 2 allows those cam faces to engage with, and disengage from, each other. This engagement and disengagement enables the second bracket 3 (the second member 140) to be rotated. As is similar in FIG. 17, rotation torque TO is designed to be generated within the ranges of the angle of the fully-closed position (25°-0°) and/or that of the fully-open position) (155°-180°) of the second member 140. Accordingly, the second member can rotate so as to execute opening and closing movements within the ranges of the just-before-fully-closed position to the fully-closed position and/or the just-before-fully-open position to the fully-open position.

In this embodiment, because the cam surfaces that the generate rotation torque TO are provided to both sides of the cylindrical bearing part 36, strong rotation torque TO can be generated. This provides for further strength for closing the second member.

The present invention is not limited to the above embodiments, and it be modified in a variety of ways. For example, coil springs can be used instead of disc springs as the elastic member 5A. Moreover, although the first bracket 2 and the second bracket 3 are pressed against each other via the first friction member 51, the first bracket 2 and the second bracket 3 can be structured in such a way that they directly press against each other.

EXPLANATIONS OF ALPHA-NUMERIC CHARACTERS IN THE DRAWINGS 1, 1A, 1B hinge
2 first bracket
3 second bracket
5 friction-torque-generating member
5A elastic member
51 first friction member
52 second friction member
21 mounting part
22 shaft part
23 connecting part
31 mounting part
32 bearing part
33 bearing part
11, 12, 37 cam surface
120 first member
140 second member

The invention claimed is:

1. A hinge that rotatably connects a first member and a second member, comprising:
 two brackets that can rotate against each other and that are respectively mounted to said first member and said second member; and
 a friction-torque-generating member including at least one friction member and at least one elastic member, and configured for generating friction torque between said two brackets;
 wherein said one of said two brackets includes a shaft part having a non-cylindrical cross-section which penetrates through an axial hole of the other bracket in the thickness direction of a bearing part so as to support the rotation of said other member, a mounting part mounted to said first member or said second member, and a connecting part connecting said shaft part or said bearing part to said mounting part, and
 wherein said shaft part, said connecting part, and said mounting part constitute a one-piece structure press-formed from a plate material,
 said connecting part rises from one end of the mounting part in a flat shape,
 said shaft part is shaped such that said shaft part is bent so as to make a right angle with said connecting part,
 said friction member and said elastic member have an axial hole, said axial hole of said friction member being rectangular, which shape corresponds to that of said shaft part of said one of said two brackets, the shaft part penetrates said axial holes of the friction member and the elastic member, so that said friction member makes surface-to-surface contact with the other bracket, and said elastic member bends in the axial direction of said shaft part to generate an axial force, which axial force causes said friction member to be pressed to the other bracket, thereby said friction torque being generated.

2. The hinge according to claim 1, wherein cam surfaces, which generate rotation torque when said brackets rotate against each other, are provided between said other bracket and said friction member of said friction-torque-generating member.

* * * * *